United States Patent [19]

Maley et al.

[11] Patent Number: 5,407,131
[45] Date of Patent: Apr. 18, 1995

[54] FUEL INJECTION CONTROL VALVE

[75] Inventors: Dale C. Maley, Fairbury, Ill.; Oded E. Sturman, Newbury Park, Calif.; Matthew S. Touvelle, Peoria, Ill.

[73] Assignee: Caterpillar Inc., Peoria, Ill.

[21] Appl. No.: 186,292

[22] Filed: Jan. 25, 1994

[51] Int. Cl.⁶ .................... F02M 51/00; F02M 47/04
[52] U.S. Cl. ........................................ 239/90; 123/506
[58] Field of Search ................ 251/333, 356, 30.02, 251/65, 30.01, 129.02; 239/585.4, 585.1, 88–95; 123/506

[56] References Cited

U.S. PATENT DOCUMENTS

| | | | |
|---|---|---|---|
| 2,144,862 | 1/1939 | Truxell | 299/107.2 |
| 2,296,492 | 9/1942 | Begley | 251/333 X |
| 2,552,445 | 5/1951 | Nielsen | 299/131 |
| 2,621,011 | 12/1952 | Smith | 251/27 |
| 2,916,048 | 12/1959 | Gunkel | 137/544 |
| 3,532,121 | 10/1970 | Sturman et al. | 137/625.4 |
| 3,570,806 | 3/1971 | Sturman et al. | 251/65 |
| 3,570,807 | 3/1971 | Sturman et al. | 251/65 |
| 3,570,833 | 3/1971 | Sturman et al. | 267/161 |
| 3,585,547 | 6/1971 | Sturman et al. | 335/227 |
| 3,604,959 | 9/1971 | Sturman | 310/12 |
| 3,683,239 | 8/1972 | Sturman | 317/150 |
| 3,703,908 | 11/1972 | Tellier | 251/333 X |
| 3,743,898 | 7/1973 | Sturman | 317/154 |
| 3,753,547 | 8/1973 | Topham | 251/120 |
| 3,814,376 | 8/1974 | Reinicke | 251/129 |
| 3,821,967 | 7/1974 | Sturman et al. | 137/624.15 |
| 3,835,829 | 9/1974 | Links | 123/139 E |
| 3,904,174 | 9/1975 | Giese | 251/333 X |
| 3,973,008 | 2/1961 | Klose | 251/333 X |
| 3,989,066 | 11/1976 | Sturman et al. | 137/624.2 |
| 4,107,546 | 8/1978 | Sturman et al. | 307/141 |
| 4,108,419 | 8/1978 | Sturman et al. | 251/30 |
| 4,114,647 | 9/1978 | Sturman et al. | 137/624.2 |
| 4,114,648 | 9/1978 | Nakajima et al. | 137/625.5 |
| 4,211,202 | 7/1980 | Hafuser | 239/88 X |
| 4,248,270 | 2/1981 | Ostrowski | 138/45 |
| 4,392,612 | 7/1983 | Deckard et al. | 239/88 |
| 4,409,638 | 10/1983 | Sturman et al. | 361/152 |
| 4,482,094 | 11/1984 | Knape | 239/88 |
| 4,501,290 | 2/1985 | Sturman et al. | 137/495 |
| 4,516,600 | 5/1985 | Sturman et al. | 137/495 |
| 4,518,147 | 5/1985 | Andresen et al. | 251/121 |
| 4,526,519 | 7/1985 | Mowbray et al. | 417/490 |
| 4,541,454 | 9/1985 | Sturman et al. | 137/505 |
| 4,558,844 | 12/1985 | Donahue et al. | 251/118 |
| 4,653,455 | 3/1987 | Eblen et al. | 123/506 |
| 4,665,875 | 5/1987 | Lakin | 123/566 X |
| 4,702,212 | 10/1987 | Best et al. | 123/472 |
| 4,794,890 | 1/1989 | Richeson, Jr. | 123/90.11 |
| 4,811,221 | 3/1989 | Sturman et al. | 364/420 |
| 4,813,599 | 3/1989 | Greiner et al. | 239/456 |
| 4,831,989 | 5/1989 | Haines | 123/506 |
| 4,846,440 | 7/1989 | Carlson et al. | 251/129.17 |
| 4,964,571 | 10/1990 | Taue et al. | 239/88 |
| 4,993,637 | 2/1991 | Kanesaka | 239/96 |
| 5,050,543 | 9/1991 | Kawamura | 123/90.11 |
| 5,082,180 | 1/1992 | Kubo | 239/124 |
| 5,121,730 | 6/1992 | Ausman et al. | 123/467 |
| 5,131,624 | 7/1992 | Kreuter et al. | 251/129.18 |

FOREIGN PATENT DOCUMENTS 0246373 3/1992 European Pat. Off. .
839743 5/1952 Germany .................. 251/333

*Primary Examiner*—Andres Kashnikow
*Assistant Examiner*—Kevin Weldon
*Attorney, Agent, or Firm*—Nate F. Scarpelli; Marshall, O'Toole, Gerstein, Murray & Borun

[57] ABSTRACT

A control valve assembly for a fuel injector includes a valve seat with fluid inlet and fluid outlet and a flat seating surface. A poppet valve has a concave end portion with knife edge for sealingly engaging the flat seating surface on the valve seat. The poppet valve is operated to close by a solenoid coil and is opened and maintained open by a return spring or a permanent magnet. Faster valve closing and faster valve opening is obtained.

17 Claims, 4 Drawing Sheets

FUEL INJECTION CONTROL VALVE

TECHNICAL FIELD

The present invention relates generally to fuel injection systems and, more particularly, to electronically-controlled fuel injectors and pressure control valves therefor.

BACKGROUND ART

An example of an electrically-controlled unit fuel injector is shown in U.S. Pat. No. 4,392,612 issued to Deckard, et al. on Jul. 12, 1983. In Deckard, et al. the injector includes a mechanically-actuated fuel pumping plunger and an electrically-actuated fuel pressure control valve assembly. The pressure control valve assembly includes a solenoid-operated poppet valve that controls fuel pressure in the unit injector in order to control fuel injection delivery. Fuel pressure is controllably enabled to be developed within the injector by electrical actuation of the pressure control valve valve assembly. Fuel pressure is controllably prevented from developing within the injector by not electrically actuating the pressure control valve assembly.

In such electronically-controlled unit injectors, the armature of the pressure control valve assembly moves the poppet valve in one direction until it engages a valve seat and holds the poppet valve in the fuel sealing position to enable fuel pressure to be developed in the unit injector, eventually resulting in fuel injection. At the end of the fuel injection cycle, the solenoid is electrically deenergized and a return spring backs the poppet valve off of the valve seat and returns the poppet valve to the valve open position which prevents the development of fuel pressure by spilling the fuel back to the fuel reservoir.

Typically, such pressure or spill control valve assemblies use complimentary angled seating surfaces on the poppet valve and the valve seat to achieve the sealing engagement therebetween so as to shut off the fuel.

Several problems have been noted in these presently available pressure control valve assemblies and it is desired to seek solutions thereto. As an example, the sealing engagement of the normally provided angled surfaces between the poppet valve and the seat requires a given pressure which in turn requires that the electrical solenoid coil and the input electrical energy be sufficient to supply the given pressure. Such angled seat configuration also requires a given valve opening force in order to cause the poppet to move so as to thereby disengage the angled surface on the valve member from the angled surface on the valve seat.

If the poppet valve could be made to seat with less than the presently required electromagnetic force, the solenoid coil could be made smaller and require less electrical input energy. Also, the less sealing force required, the coil can be smaller to produce this force. On valve opening, a smaller coil means the coil force decays faster after the coil current shuts off, which means the valve opening starts quicker for a given level of return spring force. Similarly, on the valve opening cycle, if the required sealing force on the poppet could be reduced, then the poppet valve would begin motion more quickly in disengagement from the valve seat which would cause a sharper end of fuel injection. A sharper end of fuel injection is desired so as to provide higher engine thermal efficiency and lower exhaust emissions.

Another problem with presently available pressure control valve assemblies is that they are slow to close because the electromagnetic force produced by the electrical solenoid coil must overcome the return spring force to close the poppet valve. The return spring force is relatively constant during the stroke of the poppet valve and therefore continually opposes the electromagnetic coil force acting to move the poppet valve towards closure.

The present invention is directed to overcoming one or more of the problems as set forth above.

DISCLOSURE OF THE INVENTION

In one aspect of the present invention an electronically-controlled pressure control valve assembly for a fuel injector includes a valve member and valve seat having a flat seat sealing configuration. The control valve assembly includes a valve seat having a flat seating surface and a valve member having a concave end and a formed knife edge for sealing against the flat seating surface of the valve seat. A solenoid coil when energized moves the valve member into sealing engagement with the valve seat to shut the valve member in order to begin fuel injection and return means disengage the valve member from the valve seat in order to end fuel injection.

The concave end with a knife edge on the valve member sealing against the flat seating surface of the valve seat requires less force to seal a given pressure than in the case of the presently available angled seat surfaces. Also, the concave-knife edge/flat seat sealing configuration enables the fuel injection pressure to provide a relatively higher valve opening force than in prior pressure control valve assemblies so as to open the valve member faster to cause a desirable sharper end of fuel injection.

Another advantage of the flat seat is that the flat seat requires less poppet stroke than a conventional angled style seat to achieve a given flow area across the seat for a given poppet diameter. Less stroke means faster valve response for a given input force, or the input force can be reduced to achieve the same response time.

In another aspect of the invention, a permanent magnet is used in place of the valve member return spring. The permanent magnet holds the valve member in an open position in order to prevent or end fuel injection. Energizing of the solenoid coil overcomes the force from the permanent magnet to move the valve member away from the permanent magnet and towards the valve seat. Because the magnetic force from the permanent magnet decreases during the valve stroke, more rapid closing of the rapid valve is obtained for a given input energy as compared to a control valve with a return spring having a relatively constant opposing force. On valve opening, the solenoid coil is deenergized which enables the permanent magnet and the upwards force created by the fluid pressure across the valve seat to enable the valve to open faster.

BEST MODE FOR CARRYING OUT THE INVENTION

Figure 1:
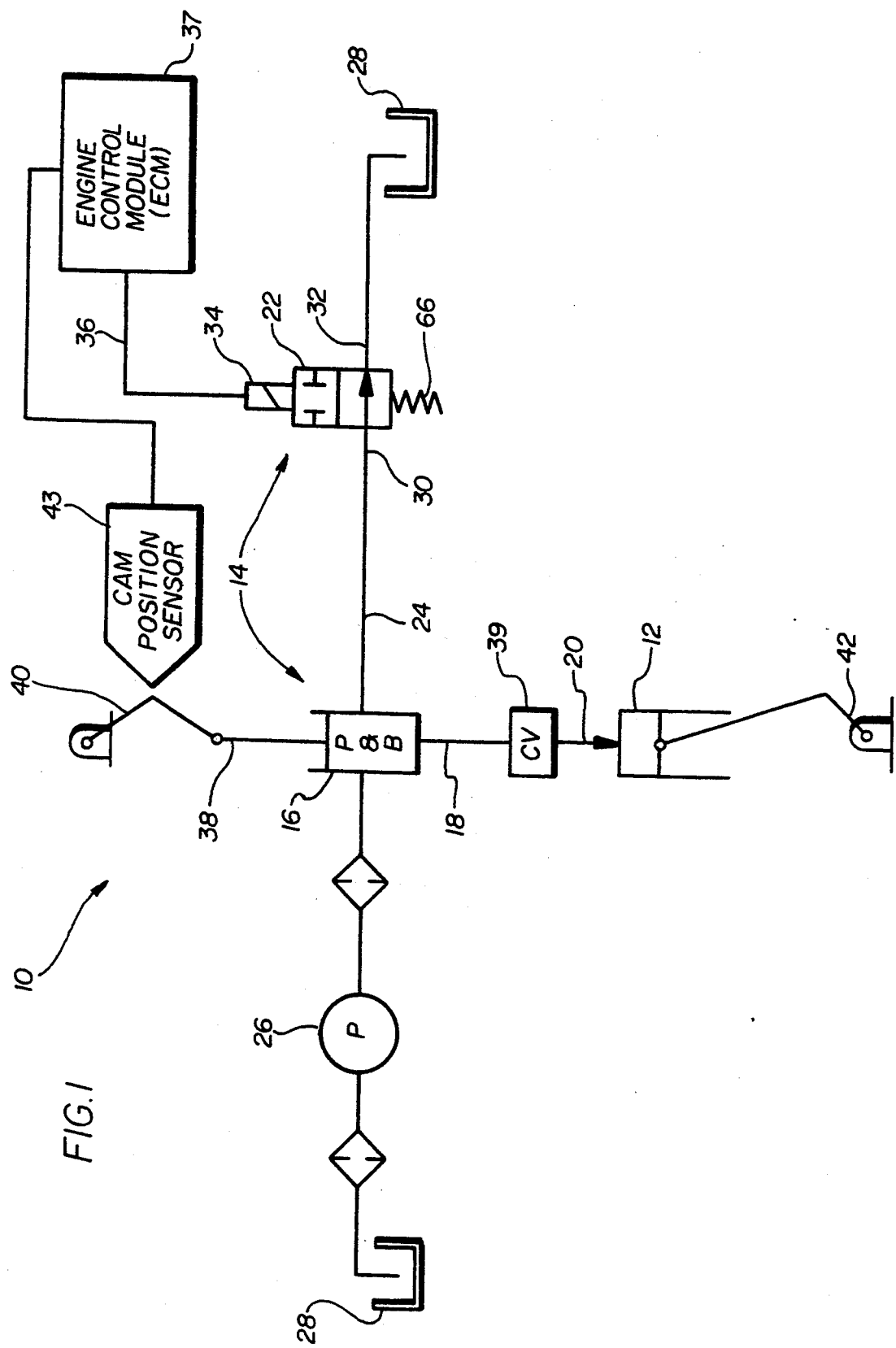
FIG. 1 is a schematic diagram illustrating a mechanically-actuated electronically-controlled unit injector fuel system.

In drawing FIGS. 1-5, the same reference numerals designate the same elements for features throughout all of the drawings. Referring now to FIG. 1, there is illustrated an injector fuel system 10. In the embodiments shown, the fuel system 10 is a mechanically-actuated electronically-controlled unit injector fuel system, hereinafter referred to a MEUI fuel injection system. The exemplary MEUI fuel injection system 10 as shown in FIG. 1 is adapted for the diesel-cycle direct-injection internal combustion engine having a number of engine pistons, only one of which, i.e. engine piston 12 is shown in FIG. 1 for convenience. Each engine piston and corresponding engine cylinder would have a mechanically-actuated electronically-controlled unit injector 14 which includes a fuel pumping assembly 16 supplying fuel to a nozzle assembly 18 leading to a tip 20, and a control valve assembly 22 for electronically controlling fuel injection delivery in the MEUI fuel system 10.

Figure 2:
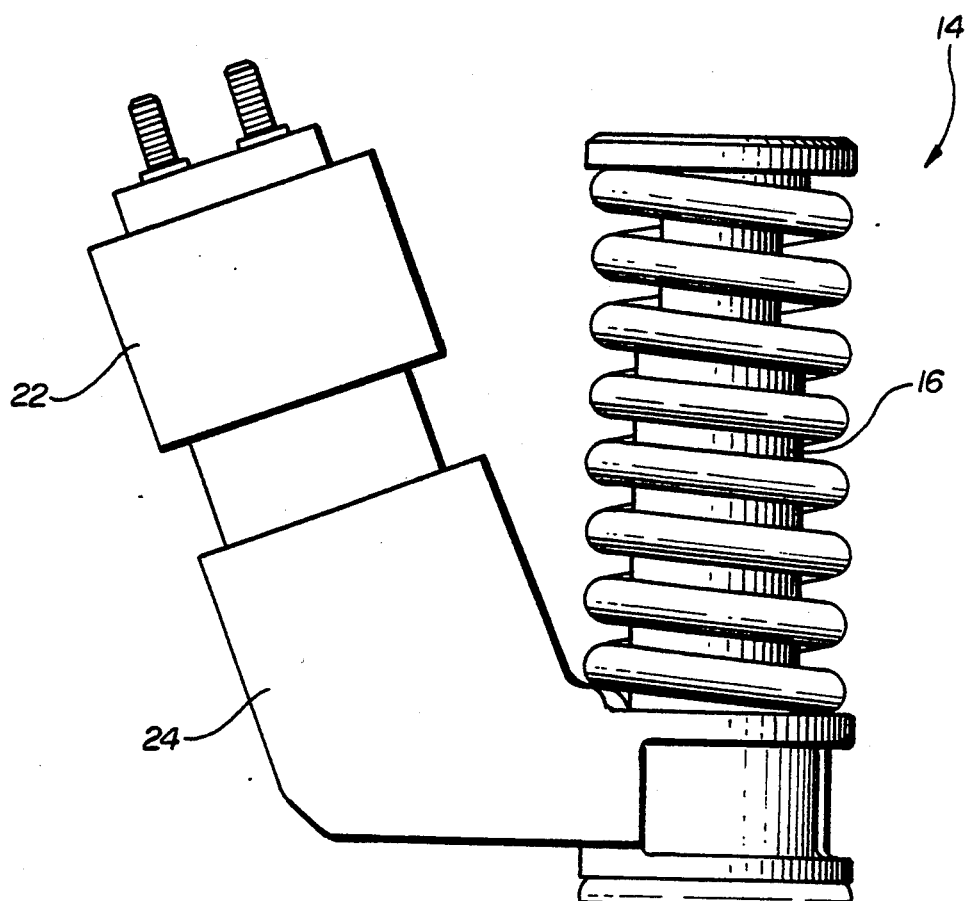
FIG. 2 is an elevational view of a unit fuel injector incorporating a pressure control valve assembly in accordance with the present invention.

The schematic view of the fuel injector 14 shown in FIG. 1 can be correlated to the same components as shown in the elevational view of FIG. 2. An injector body 24 interconnects the control valve assembly 22 with the fuel pumping assembly 16 for enabling fuel pressure to be developed or alternatively, to controllably spill the fuel back to the fuel tank to prevent the development of fuel pressure within the injector 14. The injector body 24 incorporates one or more appreciable fuel passageways between the control valve assembly 22 and the pumping assembly 16.

Figure 3:
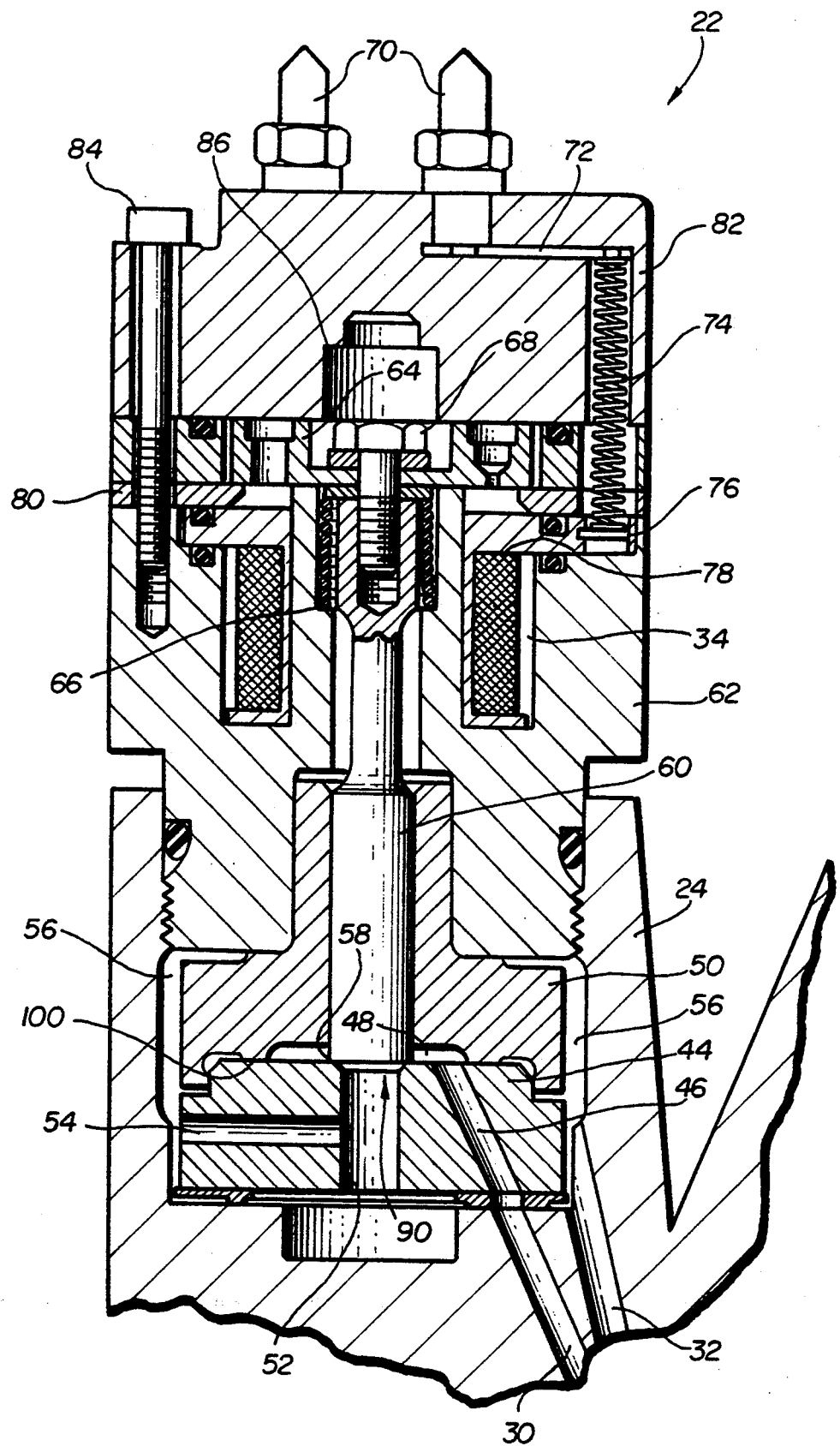
FIG. 3 is an elevational view, partly in section, of a control valve assembly according to the present invention.

Referring now to FIG. 1, a low pressure transfer pump 26 supplies fuel from a fuel source or tank 28 to the fuel injector pumping assembly 16 and via suitable passageways in injector body 24 the fuel is coupled to the control valve assembly 22. One or more fuel line filters may be provided. Referring to FIGS. 1 and 3, electromagnetically operable control valve assembly 22 has an inlet 30 for receiving the fuel and an outlet 32 which drains the fuel to a fuel gallery in the engine cylinder head for eventual return to the fuel source 28. Control valve assembly 22 includes a solenoid 34 for receiving electrical control signals on input line 36 from an engine control module 37.

Within pumping assembly 16, there is mounted a plunger 38 actuated by an engine driven cam 40. Cam 40 is in turn mounted on an engine crank 42 and the cam position is sensed by a cam position sensor 43 and coupled to the engine control module 37. Thus, the position of piston 12 as determined by crank 42 is synchronized with the position of plunger 38 as actuated by crank driven cam 40, as well as synchronized with actuation of solenoid 34 from the control signals on line 36 via the engine control module 37.

As can be seen from FIG. 1, with control valve assembly 22 in the illustrated valve open position, fuel under low pressure is pumped through the control valve assembly and outlet 32 back to the fuel gallery in the engine cylinder head. As piston 12 moves in the engine cylinder, and with corresponding movement of plunger 38 in pumping assembly 16, a position is reached where it is desired to deliver fuel to the engine, the engine control module 37 provides a signal to the solenoid 34, closing the control valve assembly 22. This effectively blocks the fuel at the fuel inlet 30 of the control valve assembly 22 and permits the fuel in the pumping assembly 16 to be pressurized. Eventually, with increasing cam actuation, pressure is reached which will actuate a check valve 39 in nozzle assembly 18 to permit the fuel to flow through tip 20 and to be injected into the engine combustion chamber defined by the piston 12. Upon the delivery of a sufficient amount of fuel, the solenoid actuating signal from the engine control module 37 on line 36 is removed from solenoid 34 so that control valve assembly 22 is opened thereby reconnecting valve input line 30 to the valve output line 32, spilling the fuel and depressurizing pumping assembly 16.

Accordingly, it can be seen that the opening and closing of control valve assembly 22 controls the pressurization of pumping assembly 16 and thereby controls the delivery of fuel to the engine. It is therefore important that the operation of the control valve assembly be as rapid as possible during the opening and closing operations.

Referring now to FIG. 3, there is illustrated a control valve assembly 22 which can provide the rapid on/off action desired for use in the MEUI fuel injection system 10 of FIG. 1. Injector body 24 includes passageways adapted to accommodate fuel inlet 30 and fuel outlet 32. A valve seat 44 includes an angled passageway 46 communicating fuel inlet 30 to a fuel chamber 48 located above valve seat 44 and below a barrel 50. Fuel chamber 48 is defined by a corresponding cavity at the bottom end of barrel 50 and the opposite flat surface of valve seat 44. Valve seat 44 further includes a central aperture 52 which communicates fuel chamber 48 with a transverse passageway 54 (with the valve open) which in turn communicates with an annular cavity 56 in the injector body 24 leading to the fuel outlet 32.

Valve seat 44 includes a flat seating surface 58 which sealingly mates with a movable valve member or poppet valve 60. The solenoid coil 34 is provided concentrically mounted with respect to the poppet valve for moving the poppet valve 60 in the downward direction of FIG. 3 until the poppet end portion seals on flat or planar seating surface 58 of valve seat 44. Solenoid coil 34 is mounted within a lower inner pole 62. Poppet valve 60 is slidably mounted and guided within the inner diameter of the barrel 50. An end portion of the poppet valve 60 is connected to a movable armature 64.

A return spring 66 is mounted between lower inner pole 62 and armature 64 to exert an upward spring force against the armature so as to move poppet valve 60 away from seat 44. Thus, with control valve assembly 22 in the open position shown in FIG. 1 wherein inlet port 30 communicates with outlet port 32, spring 66 would have lifted poppet valve 60 off of seat 44. A suitable stop bolt 68 with appropriate travel and gap shims on either side of the armature 64 are provided to adjust the position of the poppet valve 60 with respect to the flat seating surface of the valve seat 44.

Terminals 70 receive the electrical control signals from line 36 and couple the signals to controllably operate solenoid coil 34. In particular, terminal 70 is mounted on a metal plate 72, with plate 72 connected by a spring electrical contact 74 to coil plate 76 to which in turn is connected to a coil wire 78 of the solenoid coil 34. Cooperating with lower inner pole 62 is a lower outer pole 80 which is maintained in position by means of a molded cap 82 held in position by a series of bolts 84. A poppet stop 86 acts as a stop for the continued upward movement of poppet valve 60 due to the action of return spring 66 when stop bolt 68 contacts the poppet stop.

Figure 4:
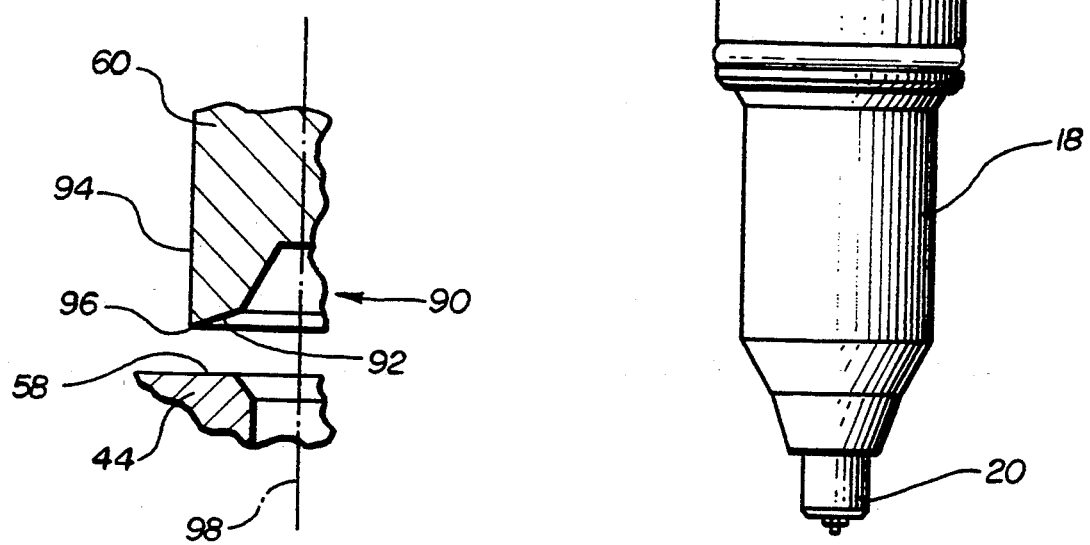
FIG. 4 is a fragmented sectional view illustrating a flat seat and a concave end with knife edge valve member in accordance with one aspect of the present invention.

FIG. 4 illustrates the details of an improved seat for the control valve assembly. Poppet valve member 60 includes a concave end 90 wherein end surface 92 is formed at a small actuated angle (for example, about a 5°) relative to the poppet exterior surface 94 thereby providing an annular or circular knife edge 96 at the intersection between end surface 92 and exterior surface 94. It is understood, of course that the valve seat 44 and poppet valve member 60 are respectively symmetrically shaped with respect to centerline 98.

The flat seating surface 58 and concave end 90 with annular knife edge 46 is easier to construct than presently available valve seats. The critical manufacturing tolerances required for a reliable seat can be achieved using known manufacturing processes for fuel injectors. For example, the flat seating surface 58 must be extremely flat. This can be achieved by surface grinding and lapping. Also, the high pressure sealing land 100 on the bottom of barrel 50 must be flat and perpendicular to the centerline of the barrel because the poppet valve member 60 is guided in the barrel diameter. This requirement can be achieved by grinding the barrel diameter and the sealing land 100 in the same chucking of a high precision internal grinder. Finally, the clearance between the outer diameter of poppet valve member 60 and the inner diameter of the barrel 50 must be very small and well controlled and can readily be achieved by fuel injection system manufacturers.

In addition to the ease of manufacturing of the flat seat/concave end with knife edge poppet valve of the present invention, this desirable configuration has additional advantages over angled seats used in presently available fuel injectors. The flat seat/concave end with knife edge poppet requires less vertical force to seal a given pressure than an angled seat. Thus, less magnetic force is required to seal a given pressure which in turn enables the solenoid coil to be smaller and thereby requiring less electrical input energy for sealing. Also, the less sealing force required, the coil can be smaller to produce this force. On valve opening, a smaller coil means the coil force decays faster after the coil current shuts off, which means the valve opening starts quicker for a given level of return spring force.

In addition, the improved flat seat poppet of the present invention provides a sharper end of fuel injection which gives higher engine thermal efficiency and lower exhaust emissions. A sharper end of a fuel injection is achieved because the flat seat configuration provides more pressure dependent opening force on the poppet valve than the prior angled seat configuration, thereby enabling the flat seat poppet to open more quickly. Finally, the flat seat configuration enables higher injection pressures (for example, about 207 MPa or 30,000 p.s.i.) to be used which provides higher engine efficiency and lower emissions.

Figure 5:
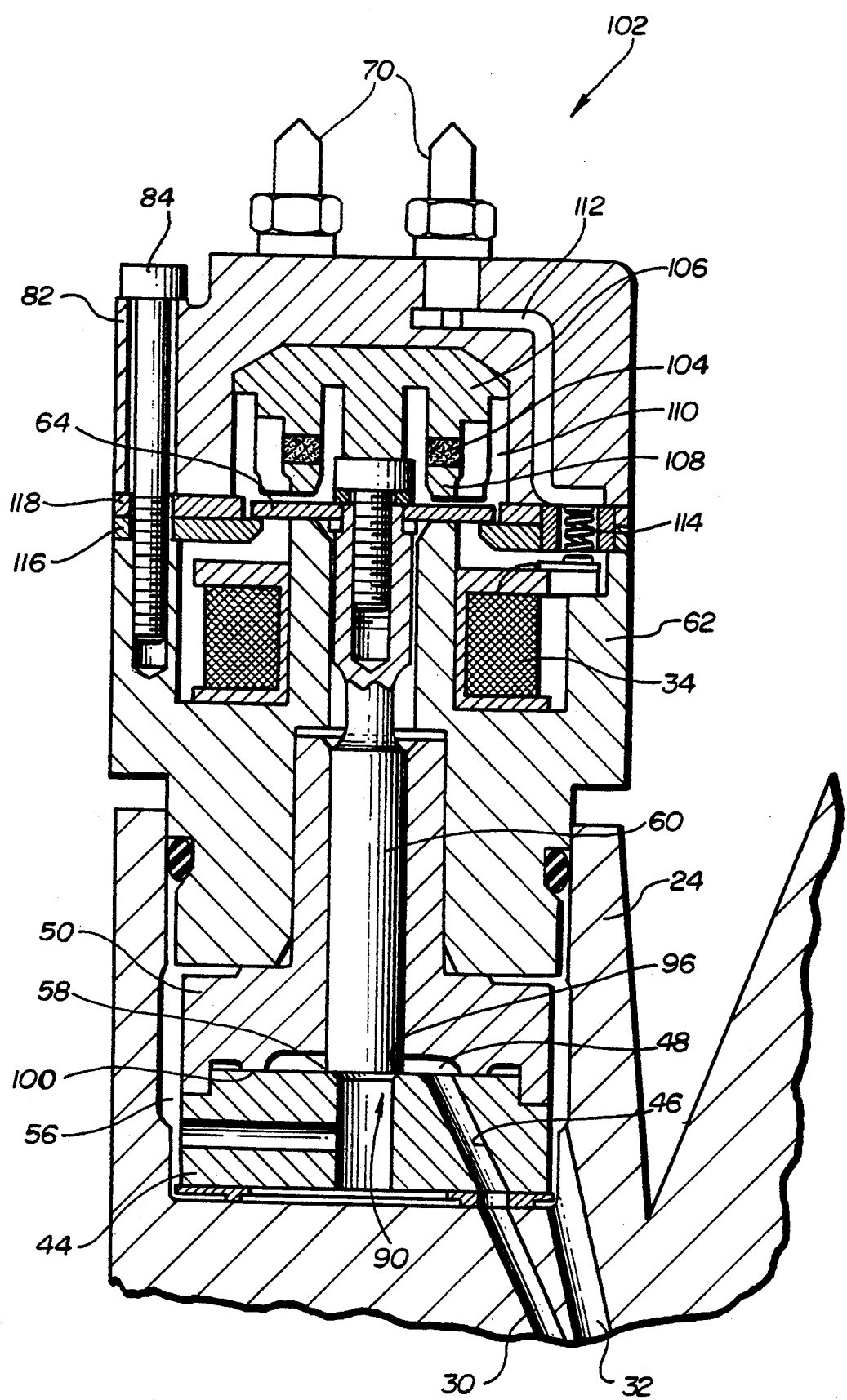
FIG. 5 is a sectional view of an alternative embodiment of a control valve assembly according to the present invention.

Turning now to FIG. 5, there is illustrated an alternative embodiment of a unit injector incorporating a permanent magnet to latch the poppet valve in the open position. Control valve assembly 102 is threadably mounted into injector body 24 in the same manner as control valve assembly 22 of the previous embodiment shown in FIG. 3. In addition, control valve assembly 102 includes many of the same components as in the prior illustrated control valve assembly 22, namely the valve seat 44 with flat seating surface 58, the concave end of the poppet valve with annular knife edge 96, and barrel 50. Similarly, the poppet valve 60 is movably guided within barrel 50 and is moved towards seat 44 by means of a solenoid coil 34 mounted within a lower inner pole 62.

In control valve assembly 102, instead of a spring return for the poppet valve 60, there is provided a permanent magnet 104. Permanent magnet 104 is mounted in a metal frame 106 and includes an upper inner pole member 108 and an upper outer pole member 110 to complete the magnetic flux path for the permanent magnet. This enables armature 64 to be acted upon by the magnetic field from permanent magnet 104 so as to maintain poppet valve 60 in a latched upper position unseated from valve seat 44. In the latched, valve unseated position, injector fuel in valve input line 30 can enter transverse passageway 46 in the valve seat, pass through the fuel chamber 48 and annular cavity 56 and exit through the inner connecting valve output line 32.

Actuation of solenoid coil 34 acts against the permanent magnet latching force to move the poppet valve 60 into a seated position on flat seating surface 58 of the valve seat so that fuel within the injector can be pressurized prior to injection. Solenoid coil terminals 70 are connected to respective coil wires within the unit and are respectively connected by means of a C-shaped connector plate 112 electrically connected to a spring electrical connector 114 which in turn is connected to the coil wires. Thus, when the coil is energized, a magnetic field developed by the coil can flow from the lower inner pole 62, to a lower outer pole 116 and armature 64, and through small air gaps therebetween so as to move poppet valve 60 into a seating position on valve seat 44. A spacer 118 formed of aluminum or other type of substantially non-magnetic material substantially isolates the magnetic field developed by solenoid coil 34 from the magnetic field developed by permanent magnet 104.

The control valve assembly 102 with magnetic return is preferred as compared to the control valve assembly 22 with spring return for the following reasons. Control valve assembly 22 is slower to close because to close the poppet valve, the magnetic force produced by the electrical coil 34 must overcome the opposing force of the return spring 66. The opposing force of spring return 66 is relatively constant during the stroking movement of the poppet valve 60. On the other hand, in connection with control valve assembly 102 with the magnetic permanent magnet return, it is easier for the electrical coil 34 to overcome the latching force from permanent magnet 104 because the permanent magnet latching force rapidly decreases as the armature 64 moves away from permanent magnet 104 during the stroking of the poppet valve 60.

However, both the control valve assembly 22 with spring return and control valve assembly 102 with the permanent magnet return provide significant advantages over control valve assemblies used in prior electronically controlled fuel injectors due to the improved concave end with knife edge/flat seating configuration of the instant control valve assemblies. In particular, after the electrical coil 34 is deenergized to end fuel injection, spring return 66 in the case of control valve assembly 22 (and permanent magnet 104 in the case of control valve assembly 102) causes the armature 64 to move up which opens the poppet seat. Fuel under high pressure in fuel chamber 48 can begin to flow across the flat seating surface 58 and under the concave end 90 of the poppet valve which creates an upwards force on the bottom of the poppet, enabling the poppet valve to open faster.

While the pressure control valve assemblies 22, 102 of the present invention have been illustrated and discussed in connection with a MEUI fuel injection system, such pressure control valve assemblies can be adapted for other fuel injection systems as well, including the hydraulically-actuated electronically-controlled injector fuel system shown in U.S. Pat. No. 5,271,371 issued to Meints et al. on Dec. 21, 1993.

INDUSTRIAL APPLICABILITY

Either control valve assembly 22 with a spring return or control valve 102 with a permanent magnet return can be used as the electrically-actuated pressure control device for the fuel injector 14 shown in the injector fuel system 10 of FIG. 1. Initially, the operation of a control valve assembly 22 with a spring return in the injector system will be described and thereafter the operation of control valve assembly 102 with a permanent magnet return will be given.

With reference to FIGS. 1-4, as the plunger in the fuel injector pumping assembly 16 starts downward, fuel pressure forces fuel through a passage in the injector body 24 into valve input line 30, through passageway 46 and into the annular area in fuel chamber 48 below the barrel 50. Since fuel injection is not ready to begin as yet, the poppet valve 60 is in the unseated or up position and maintained in that position by spring return 66. This allows the fuel to flow by the flat poppet seat between the concave end 90 of the poppet and the flat seating surface 58 of the valve seat, with the fuel continuing through central aperture 52, transverse passageway 54 and into the annular cavity 56 in the injector body. The fuel flows around the annular cavity 56 until it reaches the valve outlet leading to valve output line 32 where the fuel then flows back to a connection to the fuel gallery in the cylinder head of the engine. It is understood, of course, that during this time, the poppet valve is maintained in the unseated position against stop 86 by means of the return spring 66.

When it is time to start building pressure for fuel injection, suitable electrical operating signals (such as a selected voltage) on coil input line 36 are applied to coil 34. An electromagnetic field is then created by which the coil causes a downwards force on the armature 64. When the developed coil electromagnetic field force on the armature in a downwards direction exceeds the opposite force upwards from the return spring 66, the armature 64 and the poppet valve 60 will begin to move downwards until the concave end 90 of the poppet contacts valve seat 44. In this position, the annular knife edge 96 depressingly engages the flat seating surface 58 in a secure annular or circular seating contact and the knife edge is maintained against the flat seating surface by the electromagnetic force from coil 34.

With the knife edge 96 contacting the flat seating surface 58, the valve seat is then closed, which stops the flow of fuel by the seat as shown in FIG. 3. Since fuel flow is stopped, pressure begins to build up as the injector plunger 38 continues downwards. Once the pressure reaches a predetermined nozzle valve opening pressure, the nozzle is opened and fuel is injected from tip 20 into the engine combustion cylinder.

To stop fuel injection, the voltage to the coil supplied by operating signals on input line 36 is removed in response to the crank position sensor. The magnetic circuit created by the coil now begins to decay. Once the electromagnetic field has decayed to the point that the upwards spring force is greater than the downwards magnetic force on the armature, the poppet valve 60 begins to move upwardly away from the valve seat which opens the control valve assembly 22. The fuel under pressure in fuel chamber 48 then flows through the seat and the injection pressure begins to decay. Once this pressure falls below nozzle valve closing pressure, the nozzle check valve in the injector 14 closes, which stops injection of fuel into the respective engine combustion chamber.

The initial opening force on the poppet valve 60 is caused by the return spring 66. Once the annular knife edge 96 begins to move away from the flat seating surface 58 as the flat seat is opened slightly, the injection pressure in the fuel flowing across the seat and immediately below the concave end 90 of the poppet, adds opening force to the poppet valve. This makes the poppet valve open very fast, which gives a sharp end of the fuel injection. The poppet valve continues traveling upwards until the stop bolt 68 contacts the poppet stop 86. The return spring 66 then holds the poppet valve 60 upwardly in the valve open position until the next injection cycle. This completes the injection cycle as controlled by control valve assembly 22 with return spring 66.

The fuel injection cycle controlled by control valve assembly 102 with permanent magnet 104 is similar to that described above with respect to control valve assembly 22. The major difference in the operation is that the poppet valve 60 is held up in the open position by the permanent magnet 104. The permanent magnet creates magnetic flux which is transmitted through the magnetic circuit comprised of the frame 106, upper outer pole piece 110, armature 64, upper inner pole piece 108, and back to the permanent magnet 104 with the intermediate air gaps as shown in FIG. 5. The magnetic flux flow through the air gap creates a magnetic force upwards on the armature 64.

When it is time to start building fuel pressure within the injector 14 for injection, voltage is applied to the coil 34. An electromagnetic field is then created by the coil which causes a downward force on the armature and when the coil force exceeds the force upwards from the permanent magnet 104, the armature and poppets will begin to move downwards until the poppet contacts the valve seat 44. When the annular knife edge 96 contacts the flat seating surface 58, the valve seat is closed and the knife edge is maintained against the seating surface by the closing force from coil 34. The pressure builds and fuel injection begins as indicated previously.

To stop fuel injection, the voltage to the coil 34 is shut off and the magnetic field created by the coil begins to decay. Once the electromagnetic field created by the coil has decayed to the point where the upwards magnetic force from the permanent magnet 104 is greater than the downwards decaying magnetic force from the coil, the armature 64 and poppet valve 60 begin to move upwards which opens the flat seat. Fuel in fuel chamber 48 is under pressure and then flows through the seat so that the injection pressure begins to decay. Once this pressure falls below the nozzle valve closing pressure, the nozzle check valve closes, which stops the injection of fuel into the respective engine combustion chamber.

The initial opening force on the poppet valve 60 is caused by the upward exertion of the magnetic field from permanent magnet 104. Once the flat seat is opened slightly, the injection pressure in the fuel flowing across the concave end 90 along flat seating surface 58 adds opening force to the poppet valve by forcing the poppet valve in an upward direction. This makes the poppet valve open very fast, which gives a sharp end of injection. The permanent magnet 104 then holds the poppet valve in the latched upward position so that the poppet valve is in the valve open position until the next fuel injection cycle.

Although the fuel injection system 10 is particularly adapted for use in a diesel-cycle direct-injection internal combustion engine, the fuel injection system 10 may be used with any type of diesel engine, spark ignition engine or any other type of engine where it is necessary or desirable to inject fuel into an ignition chamber. Also, instead of the solenoid coil actuation, any other kind of mechanical, electrical, hydraulic or piezoelectric actuator or a combination thereof may be used.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A fluid pressure control valve assembly for a fuel injector comprising:
   a valve body with fluid inlet and fluid outlet ports;
   a valve seat communicating with said fluid inlet and said fluid outlet ports, said valve seat having a flat seating surface;
   a poppet valve slidably mounted in said valve body with one poppet end portion sealingly engagable with said valve seat flat seating surface to block said fluid inlet;
   an electrical actuator adapted for mounting at the other poppet end portion and operably energized for moving said poppet valve into said sealing engagement with said valve seat;
   return means coupled to said poppet valve to disengage said poppet valve from said valve seat; and
   said one poppet end portion having a concave end portion for sealingly engaging said flat seating surface of said valve seat.

2. A control valve assembly according to claim 1, wherein said return means includes a spring adapted to provide a spring force on said poppet valve to disengage said poppet valve from said valve seat when said electrical actuator is not operably energized.

3. A control valve assembly according to claim 1, wherein said return means includes a permanent magnet to provide a magnetic latching force on said poppet valve and maintain disengagement of said poppet valve from said valve seat when said electrical actuator is not operably energized.

4. A control valve assembly according to claim 1, wherein said poppet valve concave end portion includes a knife edge for sealingly engaging said flat seating surface of said valve seat in a flat seat seal on valve closing during pressurized fuel injection and for responding to pressurized fluid for rapidly opening said poppet valve.

5. A control valve assembly according to claim 4, including a barrel guide adjacent said valve seat and adapted for slidably guiding said poppet valve.

6. A control valve assembly according to claim 5, wherein said barrel guide includes a cavity facing said flat seating surface of said valve seat to define a fluid chamber communicating with said fluid inlet and said fluid outlet.

7. A control valve assembly according to claim 6, wherein said return means includes a spring adapted to provide a spring force on said poppet valve to disengage said poppet from said valve seat when said electrical actuator is not operably energized.

8. A control valve assembly according to claim 6, wherein said return means includes a permanent magnet to provide a selected magnetic latching force on said poppet valve and maintain disengagement of said poppet from said valve seat when said electrical actuator is not operably energized.

9. A control valve assembly according to claim 1, wherein said fuel injector is a unit fuel pump-injector.

10. A control valve assembly according to claim 1, wherein said electrical actuator is a solenoid.

11. An electronically-controlled fuel injector system comprising:
    an injector body having a fuel inlet and a fuel outlet;
    a fuel injection pumping assembly, including a nozzle receiving fuel from said fuel inlet for injecting said fuel under pressure from said pumping assembly;
    a pressure control valve assembly for controlling the injecting of said fuel, said control valve assembly including a valve seat having a valve seat inlet connected to said injector body fuel outlet and having a drain fuel outlet,
    said control valve assembly including,
    a poppet valve slidably mounted in said valve body with one poppet end portion sealingly engagable with said valve seat flat seating surface to block said valve seat inlet;
    said one poppet end portion having a concave end portion for sealingly engaging said flat seating surface of said valve seat;
    an electrical actuator adapted for mounting at the other poppet end portion and operably energized for moving said poppet valve into said sealing engagement with said valve seat; and
    return means coupled to said poppet valve to disengage said poppet valve from said valve seat.

12. An electronically-controlled fuel injector system according to claim 11, wherein said return means includes a spring adapted to provide a spring force on said poppet valve to disengage said poppet valve from said valve seat when said electrical actuator is not operably energized.

13. An electronically-controlled fuel injector system according to claim 11, wherein said return means includes a permanent magnet to provide a magnetic latching force on said poppet valve and maintain disengagement of said poppet valve from said valve seat when said electrical actuator is not operably energized.

14. An electronically-controlled fuel injector system according to claim 11, wherein said poppet valve concave end portion includes a complementary knife edge for sealingly engaging said flat seating surface of said valve seat in a flat seat seal on valve closing during pressurized fuel injection and for responding to said pressurized fuel for rapidly opening said poppet valve.

15. An electronically-controlled unit fuel pump-injector comprising:

an injector body with a fuel inlet and a fuel outlet;

a fuel injection pumping assembly, including a nozzle receiving fuel from said fuel inlet for injecting said fuel under pressure from said pumping assembly;

a control valve assembly for controlling the injecting of said fuel, said control valve assembly including a valve seat having a valve seat inlet connected to said injector body fuel outlet and having a drain fuel outlet, said control valve assembly including, a poppet valve slidably mounted in said valve body with one poppet end portion sealingly engagable with said valve seat flat seating surface to block said valve seat inlet;

said one poppet end portion having a concave end portion with a knife edge for sealingly engaging said flat seating surface of said valve seat in a flat seat seal on valve closing during pressurized fuel injection and for responding to said pressurized fuel for rapidly opening said valve;

a barrel guide adjacent said valve seat and adapted for slidably guiding said poppet valve, said barrel guide including a cavity facing said flat sealing surface of said valve seat to define a fuel chamber communicating with said fuel inlet and said fuel outlet;

an electrical actuator adapted for mounting at the other poppet end portion and operably energized for moving said poppet valve into said sealing engagement with said valve seat; and return means coupled to said poppet valve to disengage said poppet valve from said valve seat.

16. An electronically-controlled unit fuel pump-injector according to claim 15, wherein said return means includes a spring adapted to provide a spring force on said poppet valve to disengage said poppet valve from said valve seat when said electrical actuator is not operably energized.

17. An electronically-controlled unit fuel pump-injector according to claim 15, wherein said return means includes a permanent magnet to provide a magnetic latching force on said poppet valve and maintain disengagement of said poppet valve from said valve seat when said electrical actuator is not operably energized.

* * * * *